Jan. 23, 1940.  T. B. MARTIN  2,187,835
VARIABLE SPEED TRANSMISSION
Filed Oct. 1, 1937   2 Sheets-Sheet 2
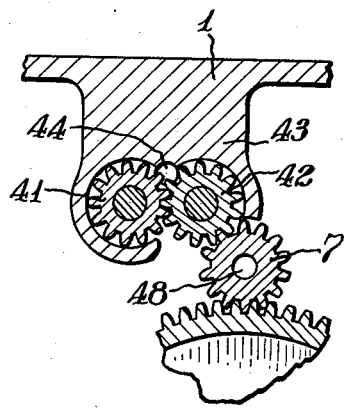
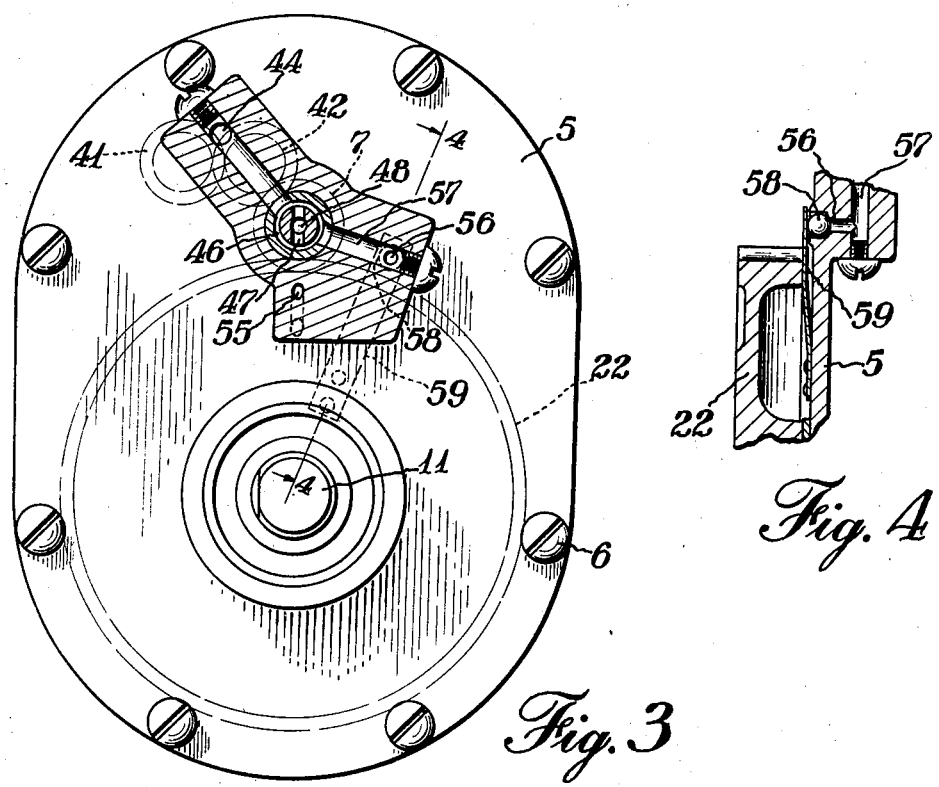
Witness:
Burr W. Jones
INVENTOR.
BY Thomas B. Martin
Clinton S. James.
ATTORNEY.

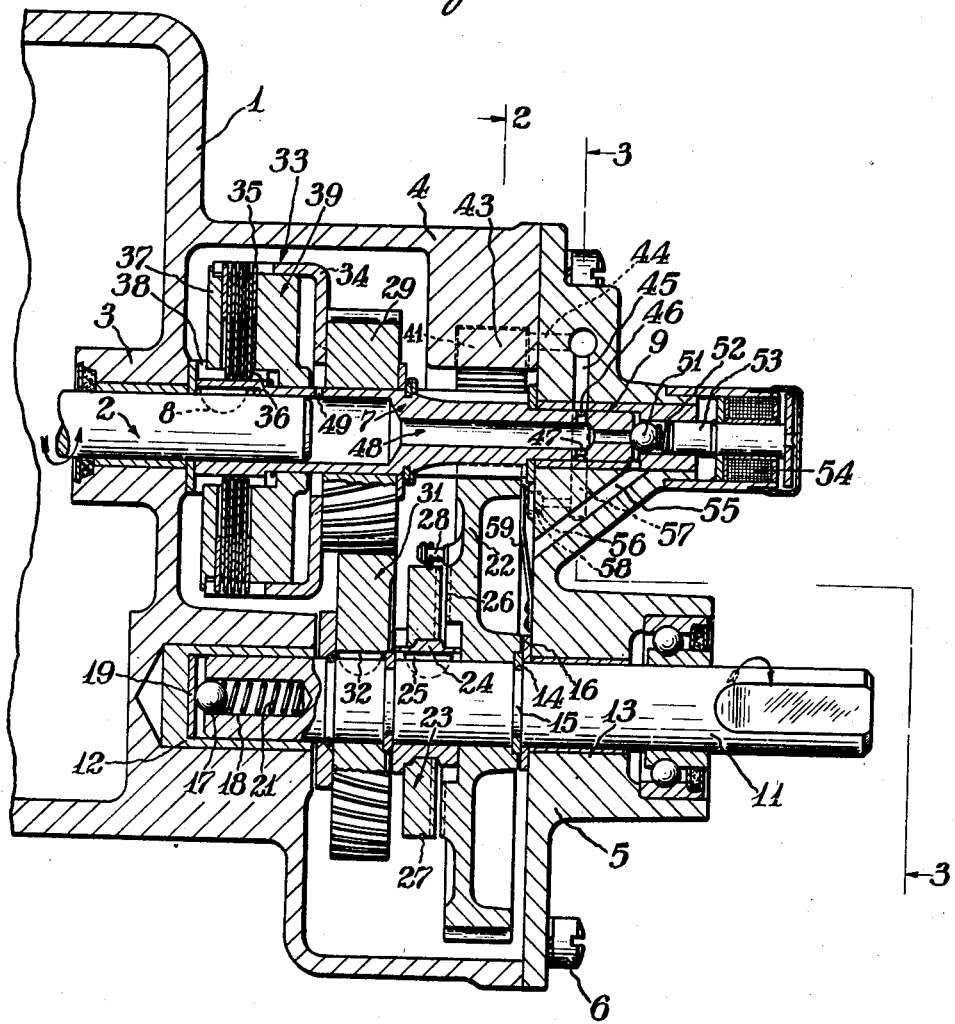

Patented Jan. 23, 1940

2,187,835

UNITED STATES PATENT OFFICE 2,187,835

VARIABLE SPEED TRANSMISSION

Thomas B. Martin, Ithaca, N. Y., assignor, by mesne assignments, to Bendix Aviation Corporation, South Bend, Ind., a corporation of Delaware Application October 1, 1937, Serial No. 166,844

11 Claims. (Cl. 74—368)

The present invention relates to a variable speed transmission and more particularly to a reduction gearing having two optional gear ratios particularly adapted for automatic or semi-automatic operation as, for instance, in connection with domestic laundry appliances.

It is an object of the present invention to provide a novel variable speed transmission incorporating hydraulic controlling means for the gearing.

It is another object to provide such a device in which the power for operating the controlling means is derived from the operation of the transmission itself.

It is a further object to provide such a device incorporating means for automatically controlling the torque transmitted therethrough.

It is another object to provide such a device in which the high speed transmission includes a friction clutch with means for automatically limiting the torque transmitted therethrough to a predetermined maximum.

Further objects and advantages will be apparent from the following description taken in connection with the accompanying drawings in which:

Fig. 1 is a vertical substantially mid-sectional view;

Fig. 2 is a detail illustrating the gear pump and operating mechanism therefor;

Fig. 3 is an end elevation of the device partly in section, the section being taken substantially on the line 3—3 of Fig. 1; and Fig. 4 is a detail in section showing the relief valve controlled by longitudinal movement of the driven shaft.

Referring first to Fig. 1 of the drawings, there is illustrated a casing 1 of a motor, not further illustrated. A power shaft 2 which may be the armature shaft of said motor is journalled at 3 in the casing and extends out into a gear housing 4 formed as a generally cup-shaped extension of the casing 1. The housing 4 is closed by a plate member 5 suitably attached thereto as by means of cap screws 6. A quill shaft and low speed pinion member 7 is arranged at one end to fit over the end of the power shaft 2 and be connected to rotate therewith as by means of a key 8. The outer end of the pinion member 7 is journaled in the plate 5 as indicated at 9. A driven shaft 11 is journalled at 12 in the casing 1 and at 13 in the plate 5, with provision for longitudinal movement in said journals, movement to the right being limited by a split thrust ring 14 seated in a groove 15 in the driven shaft and abutting against a thrust collar 16 bearing on the inside of the plate 5. Motion of the driven shaft to the left in Fig. 1 is resisted by yielding means in the form of a ball 17 slidably mounted in a recess 18 in the end of the driven shaft, bearing against a thrust plate 19 seated in the end of the bearing 12. A spring 21 seated in the recess 18 serves to press the ball 17 against the thrust plate 19 and thereby yieldingly maintain the driven shaft in its normal position with the thrust ring 14 bearing on the collar 16.

A low speed transmission between the power shaft 2 and the driven shaft 11 is provided in the form of a low speed gear 22 journalled on the driven shaft 11 in position to mesh with the pinion member 7 and connected to drive the driven shaft by means of an overrunning clutch. As here shown, the overrunning clutch includes a disc member 23 threaded on a hollow shaft 24 keyed as indicated at 25 to the driven shaft. The pitch of the threads on shaft 24 is such as to move the clutch member 23 into engagement with a cooperating clutch surface 26 on the driven gear 22 when the clutch member 23 overruns the screw shaft 24. Means for causing such engagement of the clutch member 23 is provided in the form of a friction ring member 27 slidably mounted in a groove on the periphery of the clutch member and connected to rotate with the gear member 22 by suitable means such as indicated at 28.

A high speed transmission between the power shaft 2 and the driven shaft 11 is provided in the form of a high speed gear 29 journaled on the pinion member 7 and arranged to mesh with a high speed driven gear 31 keyed as indicated at 32 on the driven shaft. Means for transmitting rotation from the pinion member 7 to the high speed driving gear 29 is provided in the form of a high speed clutch indicated generally by numeral 33.

According to the present invention, means under the control of the operator are provided for closing and relaxing the high speed clutch 33 in order to operate the driven shaft optionally in high or low gear with respect to the power shaft 2. For this purpose the clutch 33 is formed with a barrel member 34 suitably fixed to the high speed drive gear 29, and a series of friction discs, 35 and 36 are splined alternately to the barrel 34 and the periphery of the quill shaft and pinion member 7. The pack of clutch discs 35, 36 is arranged to bear against a thrust plate 37 seated against a shoulder 38 on the end of the quill shaft and pinion member 7, and means are provided for compressing the clutch discs thereagainst in the form of a piston member 39 slidably mounted in the barrel 34 in position to bear against the clutch pack and actuated to that effect by fluid pressure under the control of the operator.

The fluid pressure for operating the clutch is derived from the actuation of the transmission by means of a gear pump formed by a pair of intermeshing gears 41 and 42 (Fig. 2) rotatably mounted in a pump housing 43 attached to or formed in the gear housing 4 in position to be immersed in the lubricant contained in said housing. Gear 42 is arranged to mesh with the driving pinion member 7 so that the pump members rotate constantly during the operation of the transmission.

Means for transmitting the lubricant under pressure from the gear pump 41, 42 to the high speed clutch barrel 34 is provided in the form of conduits 44 and 45 in the closure plate 5, groove 46 in the periphery of the pinion member 7 registering with the conduit 45, radial openings 47 intersecting the groove, and a conduit 48 traversing the quill shaft and pinion member 7 and connected by radial openings 49 with the interior of the barrel 34.

A by-pass valve for the fluid is provided in the form of a ball 51 bearing against and normally closing the open end of the conduit 48 in the pinion member 7, being held thereagainst by a spring 52 actuated by the plunger 53 of a solenoid 54. It will be understood that the solenoid 54 is energized in any suitable manner under the control of the operator so as to close the by-pass and thus cause closure of the high speed clutch 33 when high speed operation of the transmission is desired. The overflow from the by-pass valve 51 is conducted by a conduit 55 in the plate 5 back to the interior of the housing.

Means are provided for automatically limiting the torque to be transmitted by the high speed clutch, such means comprising a relief valve in the form of a port 56 (Fig. 4) connected by a conduit 57 to the conduit 45 and normally closed by a ball 58 which is retained in position by a yielding plate member 59.

The retaining plate 59 is moved in a direction to maintain the relief valve closed by engagement with a member mounted on the driven shaft whereby the yielding pressure of the spring 21 on the driven shaft is transmitted to the plate member 59 to close the relief valve. As here illustrated, the member on the driven shaft which engages the plate member 59 is the driven gear 22, but it will be understood that any other arrangement may be used whereby the force of the spring 21 on the driven shaft is transmitted to the plate 59 to close the relief valve.

Load-controlled means for opposing the action of the spring 21 and permitting the relief valve to open is provided by forming the teeth of the high speed gears 29, 31 with a suitable helical inclination whereby the transmission of torque to the driven gear 31 is accompanied by a longitudinal component tending to move the driven shaft 11 to the left in Fig. 1 against the action of spring 21. It will be understood that the stiffness of spring 21 is so chosen in conjunction with the helical angle of the high speed driving gears that the relief valve will be permitted to open when the maximum desirable torque through the high speed gears is exceeded. The spring 21 may, of course, be readily adjusted by inserting spacers below the spring in the recess 18.

In the operation of the device, and considering first the condition when the solenoid 54 is deenergized so that the by-pass valve 51 is loose, energization of the power shaft 2 causes rotation of the quill shaft and pinion member 7 which rotates the low speed driven gear 22, causing the overrunning clutch 23, 26 to close and transmit rotation to the driven shaft 11 at low speed. At this time, lubricant from the housing is pumped by the gears 41, 42 through conduits 44, 45 to the conduit 48 in the interior of the pinion member 7. The lubricant is allowed to escape therefrom without generating appreciable pressure, however, by reason of the open condition of the by-pass valve 51 which permits the lubricant to return to the interior of the housing through the conduit 55.

When it is desired to operate the transmission in high gear, the operator causes energization of the solenoid 54, thus closing the by-pass valve 51, whereupon the lubricant pressure is transmitted through conduit 48 and openings 49 to the interior of the clutch barrel 34 where it acts on the piston 39 to compress the clutch discs 35, 36 against the thrust plate 37 and thereby connect the high speed gear 29 for rotation with the power shaft 2. The rotation of gear 29 is transmitted through the driven high speed gear 31 to the driven shaft 11 to rotate it at high speed, causing the clutch 23, 26 to overrun.

If the torque transmitted during acceleration of the driven shaft by the high speed gearing reaches a predetermined maximum, the longitudinal component produced by the helical arrangement of the teeth becomes sufficient to overcome the spring 21 and move the driven shaft 11 more or less to the left, thus permitting the relief valve 58 to open more or less and relieve the hydraulic pressure in the clutch operating system. The high speed clutch 33 is thus permitted to slip and partially relieve the load on the transmission. As soon as the unusual resistance to rotation of the driven shaft has been overcome, the reduction in the torque transmitted through the high speed gearing permits the driven shaft to be returned to its normal position by the spring 21 whereby the relief valve 58 is closed and the high speed clutch 33 caused to operate without slipping.

When it is desired to return to low speed drive, it is merely necessary for the operator to cause deenergization of the solenoid 54, whereupon the by-pass valve 51 is permitted to open, thus relaxing the high speed clutch 33 and permitting the low speed clutch 23, 26 to pick up and drive the driven shaft at low speed.

Although but one embodiment of the invention has been shown and described in detail, it will be understood that other embodiments are possible and various changes may be made in the design and arrangement of the parts without departing from the spirit of the invention as defined in the claims appended hereto.

What is claimed is:

1. Transmission means including a gear train and a friction clutch, fluid-pressure means for closing said clutch, and torque-responsive means for relieving the fluid pressure to thereby limit the transmission of torque through the gear train.

2. Transmission means including helical gearing and a friction clutch, fluid-pressure means for closing the clutch, and means actuated by a predetermined end thrust of the helical gearing for relieving the fluid pressure to limit the transmission of torque through the gearing.

3. In a variable speed transmission, a low speed gear train including an overrrunning clutch, a high speed gear train including a friction clutch, closing means for said friction clutch including a source of fluid pressure and means for conducting and applying said pressure to close the clutch, a relief valve for said pressure, and means actuated by the torque transmitted through the high speed gear train for controlling said relief valve.

4. In a variable speed transmission, a low speed gear train including an overrunning clutch, a high speed gear train including a friction clutch, closing means for said friction clutch including a source of fluid pressure and means for conducting and applying said pressure to close the clutch, a relief valve for said pressure, yielding means normally holding said relief valve closed, and means responsive to the torque transmitted through the high speed gearing for overcoming said yielding means and relaxing said valve.

5. In a variable speed transmission, an oil-tight housing, gearing mounted therein including a gear connection comprising a normally open friction clutch, and means for closing the clutch including a fluid pump in the housing driven from the transmission, means for conducting fluid under pressure from the pump and utilizing it to close the clutch, a by-pass for said fluid, and means responsive to the torque transmitted through the gear connection for opening and closing said by-pass.

6. In a variable speed transmission, an oil-tight housing, gearing mounted therein including constantly rotating low speed gearing, a fluid pump in the housing driven by the gearing, high speed gearing including a hydraulically controlled friction clutch, means for conducting fluid under pressure from the pump to said clutch, a relief valve for permitting the fluid to escape into the casing, and means responsive to variations in load on the high speed gearing for controlling the opening of the relief valve.

7. In a variable speed transmission, a power shaft, a driven shaft, a low speed gear train therebetween including a pinion member connected to rotate with the power shaft, and a gear having an overrunning clutch connection with the driven shaft, a high speed connection between the shafts including a friction clutch, a gear pump actuated from the power shaft, means for transmitting fluid under pressure from the pump and utilizing said fluid to close the clutch, a by-pass valve for said fluid, and means responsive to the torque transmitted through the gearing for controlling said valve.

8. In a variable speed transmission, a power shaft, a helical driving gear, a friction clutch for connecting the gear to the shaft, a source of fluid pressure actuated from the power shaft, means for conducting and applying said pressure to close the clutch, a pressure-relief valve for said conducting means, a driven shaft, a helical driven gear fixed thereon meshing with the drive gear, means movable by the driven shaft for holding said valve closed, and yielding means for biasing the driven shaft into valve-closing position, the inclination of the teeth of the gears being such that the transmission of torque therethrough causes an end thrust on the driven shaft opposing said yielding means.

9. In a variable speed transmission, a power shaft, a helical driving gear, a friction clutch for connecting the gear to the shaft, a source of fluid pressure actuated from the power shaft, means for conducting and applying said pressure to close the clutch, a pressure-relief valve for said conducting means, a driven shaft, a helical driven gear fixed thereon meshing with the drive gear, and means whereby the axial thrust on the driven shaft caused by the transmission of a predetermined torque through said gears causes the relief valve to open and reduce the pressure on the clutch.

10. In a variable speed transmission, a drive shaft, a hollow quill shaft and driving clutch member splined thereon, a gear and driven clutch member in the form of a barrel journalled on the quill shaft, clutch discs in the barrel splined alternately to the quill shaft and barrel, means including a piston slidably mounted in the barrel for compressing the discs, means for supplying fluid under pressure through said quill shaft to the interior of the barrel to actuate the piston, and means responsive to torque transmitted by said gear for regulating the pressure of said fluid.

11. In a variable speed transmission, a drive shaft, a hollow quill shaft and driving clutch member splined thereon, a gear and driven clutch member in the form of a barrel journalled on the quill shaft, clutch discs in the barrel splined alternately to the quill shaft and barrel, means including a piston slidably mounted in the barrel for compressing the discs, means including a pump driven by the quill shaft for supplying fluid under pressure through the quill shaft to the interior of the barrel to actuate the piston, by-pass means for relieving the pressure of said fluid, means under the control of the operator for closing the by-pass means, and means responsive to torque transmitted by said gear for regulating the pressure of said fluid.

THOMAS B. MARTIN.